Jan. 18, 1927.
J. C. WILSON
FLUID METER
Filed March 1, 1918
1,614,702
6 Sheets-Sheet 1
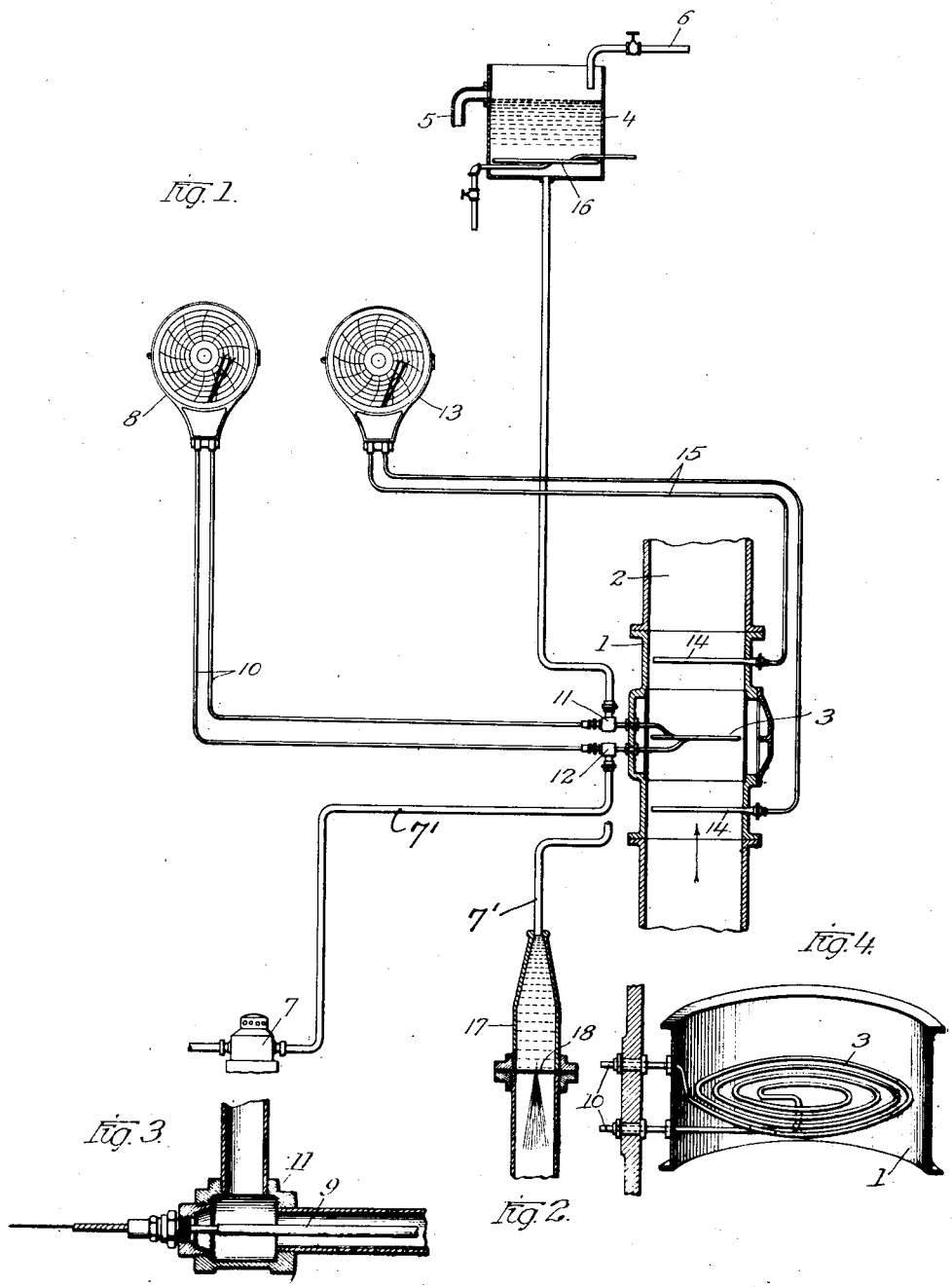
Inventor
John C. Wilson
By (signature)
Atty.

Jan. 18, 1927. 1,614,702
J. C. WILSON
FLUID METER
Filed March 1, 1918 6 Sheets-Sheet 2
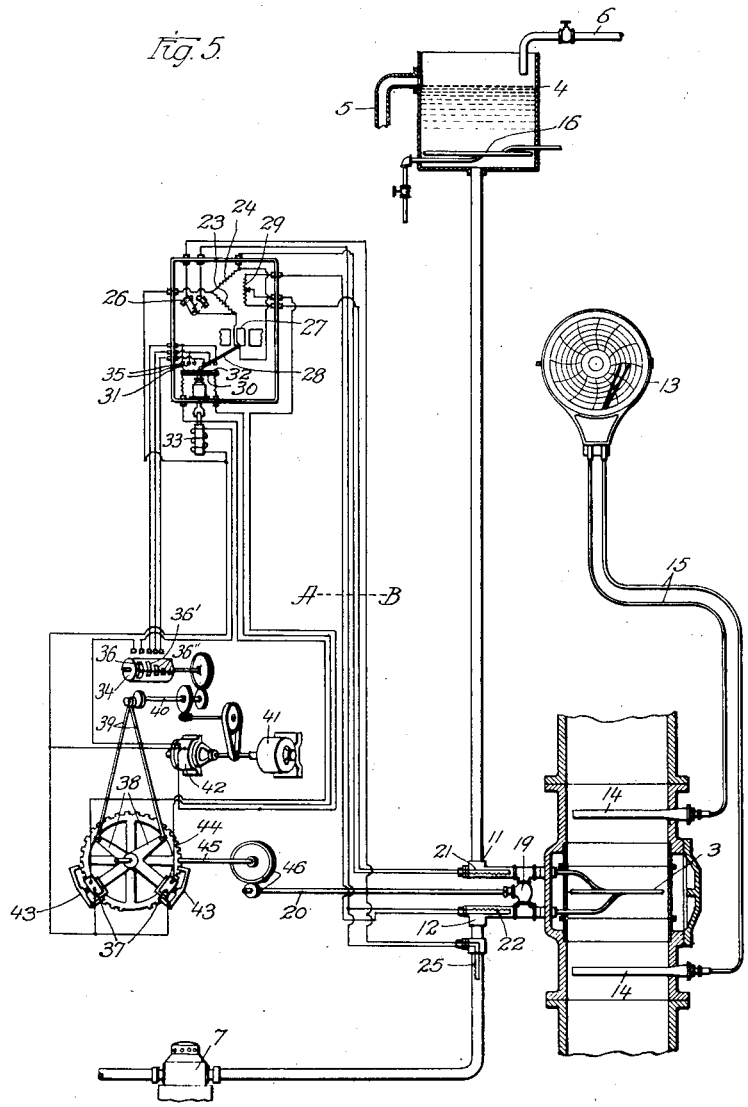
Fig. 5.
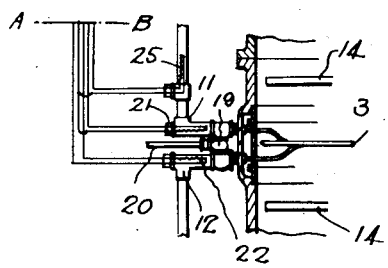
Fig. 5ª.
Inventor
John C. Wilson
By Edwin B. H. Towes, Jr.
Atty.

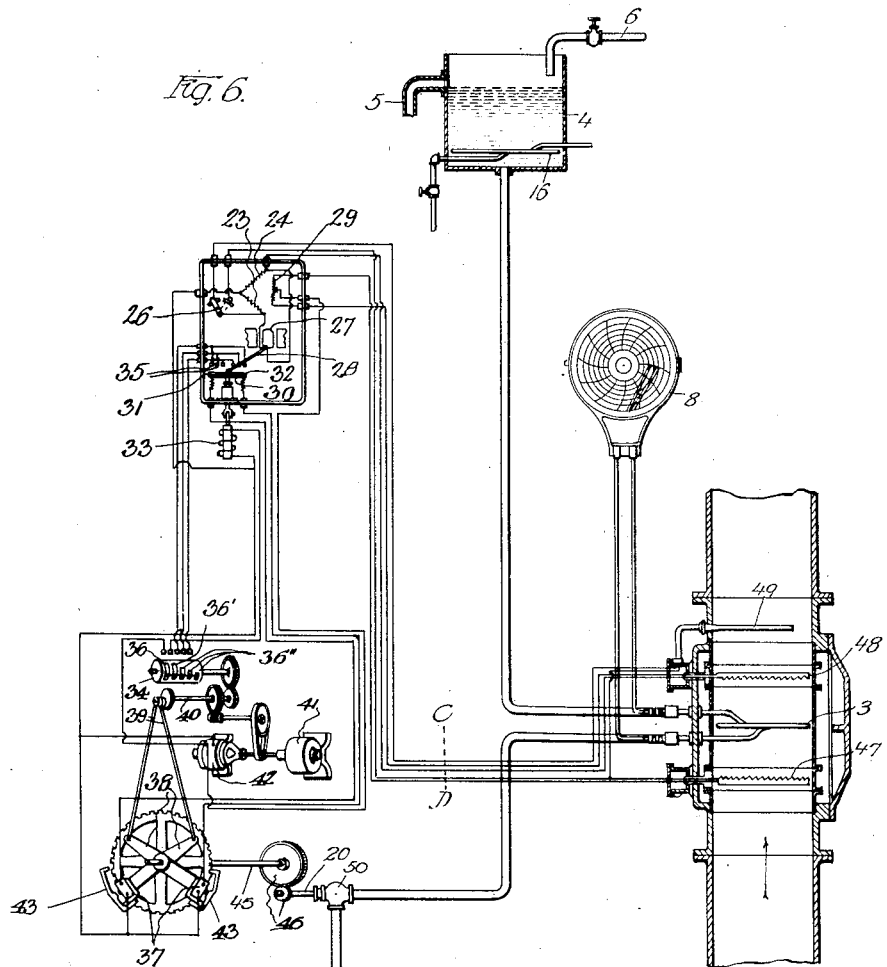
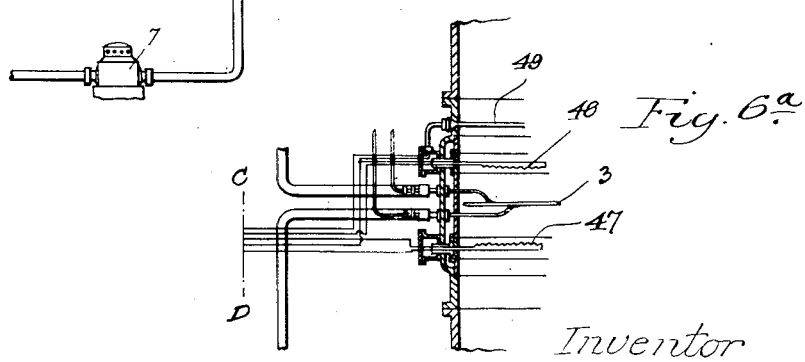

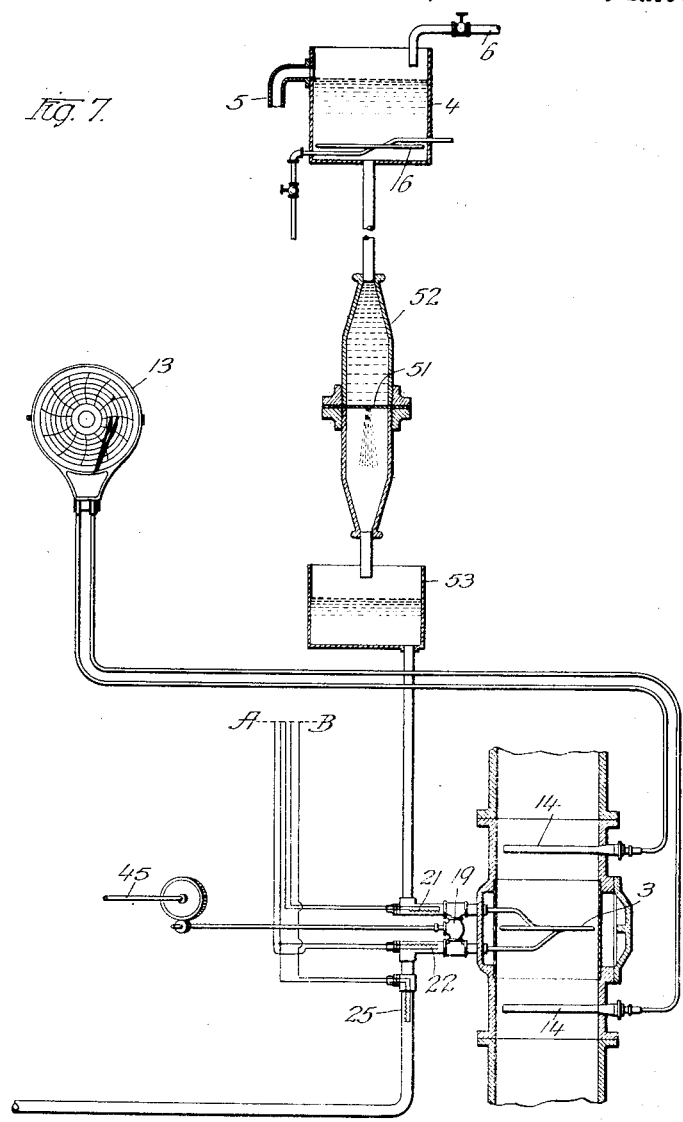

Jan. 18, 1927.

J. C. WILSON

FLUID METER

Filed March 1, 1918

Inventor
John C. Wilson
By: [signature]
Atty.

Jan. 18, 1927.  
J. C. WILSON  
FLUID METER  
Filed March 1, 1918

Inventor  
John C. Wilson  
By: Edwin B. H. Sands, Jr.  
Atty.

Patented Jan. 18, 1927.

1,614,702

UNITED STATES PATENT OFFICE.

JOHN C. WILSON, OF MILWAUKEE, WISCONSIN, ASSIGNOR TO THE CUTLER-HAMMER MFG. CO., OF MILWAUKEE, WISCONSIN, A CORPORATION OF WISCONSIN.

FLUID METER.

Application filed March 1, 1918. Serial No. 219,764.

This invention relates to fluid meters.

It has been proposed to measure the rate of flow of fluid by causing a heat transfer between a liquid or fluid medium and the fluid to be measured, and utilizing the effect of the heat transfer in determining the rate of flow of the fluid.

Those meters in which the transfer of heat takes place from the fluid to be measured to the liquid or fluid medium, or in other words in which the fluid to be measured is cooled by the liquid or fluid medium, have not been practical because such meters are only serviceable for use where the temperature of the incoming fluid or gas to be measured remains constant. With these meters it is presupposed that the temperature of the incoming gas remains the same but this is a condition which is seldom met with in practice.

In meters in which heat is transferred to or imparted to the fluid to be measured by the liquid or fluid medium it is the quantity of heat which is used to heat the liquid or fluid medium that is utilized in determining the rate of flow. It is, therefore, assumed that all of the heat used in heating the liquid or fluid medium is transmitted to the fluid to be measured.

One object of this invention is to provide a meter in which heat is absorbed from the liquid or fluid medium and which will measure the rate of flow accurately regardless of the temperature of the incoming gas.

Another object is to provide a meter in which heat is imparted or transmitted to the fluid to be measured and in which the amount of heat used in heating the liquid or fluid medium may be disregarded.

Another object is to provide a meter in which the amount of heat actually imparted to the fluid to be measured by the liquid or fluid medium is measured and utilized in determining the rate of flow.

Another object is to provide improved methods of measuring the rate of flow of fluids.

The meter comprises in general means for circulating a liquid or fluid medium in heat exchanging relation with the fluid to be measured, means for utilizing the temperature change of this medium in determining the rate of flow, means for utilizing the quantity of such medium in determining the rate of flow and means for utilizing the temperature change of the fluid to be measured in determining the rate of flow.

The accompanying drawings illustrate several forms of meters each of which comprises a set or combination of the means above mentioned.

The views of the drawings are as follows:

Fig. 1 is a diagrammatic representation of one type of meter constructed in accordance with the invention.

Fig. 2 is a sectional view of a part which is to be used in conjunction with the meter of Fig. 1 when the rate of flow is to be determined by a slightly different method.

Fig. 3 is a detail sectional view showing the manner in which the thermometer bulbs are positioned in the extremities of the liquid or fluid coil.

Fig. 4 is a detail perspective view, partly in section, showing the coil through which the liquid or fluid medium flows that transmits heat to the fluid to be measured or absorbs heat therefrom.

Figure 8:
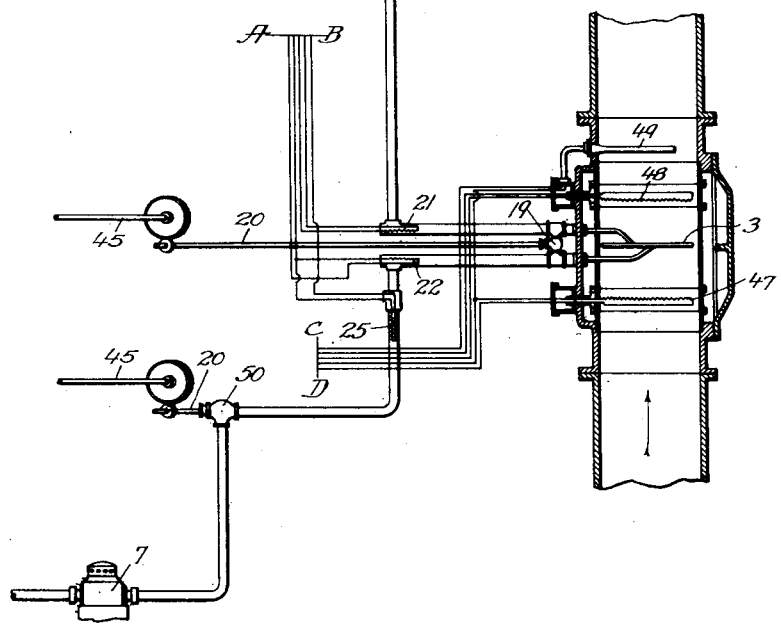

Figs. 5 to 9 inclusive are diagrammatic views of different types of meters that may be used to measure the rate of flow by different variations of the method to be hereinafter described, Fig. 5ª being a diagrammatic view of a portion of Fig. 5, showing the electrical connections modified and Fig. 6ª being a diagrammatic view of a portion of Fig. 6, showing the electrical connections modified.

Throughout the following description, the liquid or fluid medium that is circulated in heat exchanging relation with the fluid to be measured will be referred to as the fluid medium. Water is preferably used for this purpose. However, it will be understood that any fluid may be used. The purpose in using the term fluid medium throughout is to distinguish this medium from the fluid to be measured. The fluid to be measured will hereinafter be called the fluid.

The fluid medium is brought into heat exchanging relation with the fluid by its being caused to flow through a coil positioned in the conduit through which the fluid flows. This coil may impart heat to the fluid or it may absorb heat from the fluid. The quantity of fluid medium which passes through this coil in a given period of time is utilized in determining the rate of flow of the fluid, the temperature change of the fluid medium before and after it passes through the coil is utilized in determining the rate of flow of the fluid, and the temperature change of the fluid before and after it comes in contact with the coil is utilized in determining the rate of flow of the fluid. The manner in which these different factors are utilized in determining the rate of flow will be clear from the following description.

In using a meter constructed in accordance with the present invention there are four factors involved:

1. Quantity of fluid medium.
2. Temperature change of fluid medium.
3. Temperature change of fluid.
4. Quantity of fluid.

The quantity of fluid flowing in unit time, that is to say, the rate of flow, may be determined from the first three of the above factors in accordance with the following equation:

$$Q_F = \frac{Q_W \times T_W \times S_W}{T_F \times S_P}$$

in which, $Q_F$ equals the number of cubic feet of fluid per hour.

$Q_W$ equals the pounds of fluid medium per hour.

$T_W$ equals the change in temperature of fluid medium in degrees Fahrenheit.

$S_W$ equals specific heat of fluid medium or the number of B. t. u. required to heat one pound of the fluid medium one degree Fahrenheit.

$T_F$ equals the change in temperature of the fluid in degrees Fahrenheit.

$S_P$ equals the number of B. t. u. required to heat one cubic foot of the fluid one degree Fahrenheit.

As the fourth factor, namely the quantity of fluid, is the quantity to be determined it may be obtained by determining the other three factors and using them in the above equation. These factors may be determined by measuring all three of them, by maintaining one of them constant and measuring the other two, or by maintaining two of them constant and measuring the third. For instance the factors may be determined in any one of the following ways:—

1. (1), (2) and (3) measured.
2. (1) constant, (2) and (3) measured.
3. (2) constant, (1) and (3) measured.
4. (3) constant, (1) and (2) measured.
5. (1) and (2) constant, (3) measured.
6. (2) and (3) constant, (1) measured.
7. (1) and (3) constant, (2) measured.

Any one of the following methods may therefore be used in obtaining the necessary factors to be used in determining the rate of flow.

1. Measuring the quantity of the fluid medium. Measuring the temperature change of the fluid medium. Measuring the temperature change of the fluid.
2. Maintaining the quantity of the fluid medium constant. Measuring the temperature change of the fluid medium. Measuring the temperature change of the fluid.
3. Maintaining the temperature change of the fluid medium constant. Measuring the quantity of the fluid medium. Measuring the temperature change of the fluid.
4. Maintaining the temperature change of the fluid constant. Measuring the quantity of the fluid medium. Measuring the temperature change of the fluid medium.
5. Maintaining the quantity of fluid medium constant. Maintaining the temperature change of the fluid medium constant. Measuring the temperature change of the fluid.
6. Maintaining the temperature change of the fluid medium constant. Maintaining the temperature change of the fluid constant. Measuring the quantity of the fluid medium.
7. Maintaining the quantity of the fluid medium constant. Maintaining the temperature change of the fluid constant. Measuring the temperature change of the fluid medium.

The different forms of meters illustrated in the drawings are adapted to carry out the above methods. There has been illustrated one type of meter for carrying out each of these methods.

Fig. 1 discloses a meter by which the factors necessary for determining the rate of flow may be obtained in accordance with method No. 1. In this method each of the factors is measured and therefore Fig. 1 discloses means adapted to measure these factors. The meter comprises a housing 1 adapted to be connected to a gas main 2 through which flows the fluid whose rate of flow is to be measured. A coil 3 is positioned in the housing 1 and it is through this coil that the fluid medium circulates. The fluid medium such as water may be supplied to the coil 3 from a tank 4 that may have an overflow outlet 5 and a supply pipe 6. The quantity of fluid medium which passes through the coil 3 may be measured by a meter or other suitable measuring device 7 connected to the outlet of the coil 3 by a pipe 7'.

The coil 3 is shown in perspective in Fig. 4. The pipe forming the coil is preferably uniformly distributed over the area within the housing or conduit so that it will uniformly act upon the fluid or be uniformly acted upon by the fluid.

The temperature change of the fluid medium before and after it passes through the coil 3 is measured by a thermometer which comprises the recording or indicating instrument 8, a pair of thermometer bulbs 9 inserted in the extremities of the coil 3, and the tubes 10 which connect the thermometer bulbs with the recording or indicating instrument 8. The manner in which the thermometer bulbs 9 are positioned in the entrance and the exit of the coil 3 is illustrated in Fig. 3. One of these bulbs is positioned in the entrance to the coil 3 at 11 and the other is positioned in the exit of the coil 3 at 12. One of the thermometer bulbs is therefore subjected to the temperature of the fluid medium before it passes through the coil and the other thermometer bulb is subjected to the temperature of the fluid medium after it has passed through the coil. The temperature of these thermometer bulbs is indicated upon a chart placed in the instrument 8. By reading this chart the difference in temperature between the incoming and outgoing fluid medium in coil 3 may be obtained.

The temperature change of the fluid is measured by a thermometer comprising a recording or indicating instrument 13, a pair of thermometer bulbs 14, and a pair of tubes 15 connecting the thermometer bulbs with the instrument 13. One of the thermometer bulbs 14 is placed in the housing 1 in advance of the coil 3 and the other is placed in the housing at the other side of the coil 3. One of these bulbs is therefore subjected to the temperature of the incoming fluid and the other bulb is subjected to the temperature of the fluid after it has been heated or cooled by the coil 3. The temperature of the bulbs 14 is indicated upon a chart positioned in the instrument 13. By reading this chart the difference in temperature between the incoming and outgoing fluid may be obtained.

If heat is to be imparted to the fluid by the coil 3 the fluid medium in the tank 4 may be heated by suitable means such as the heating coil 16. If the coil 3 is to serve the purpose of absorbing heat from the fluid, that is, if it is to cool the fluid the coil 16 may if desired be used as a cooling coil.

It will now be seen that the meter disclosed in Fig. 1 comprises means for measuring the quantity of fluid medium, namely, the meter 7; it comprises means for measuring the temperature change of the fluid medium, namely, the instrument 8 and its associated parts, and it comprises means for measuring the temperature change of the fluid, namely the instrument 13 and its associated parts. The meter may therefore be used to measure the three variables included in method No. 1 and therefore method No. 1 may be carried out by the meter shown in Fig. 1.

Fig. 2 illustrates a part which may be used in conjunction with the meter shown in Fig. 1 in order that it may be used to carry out method No. 2. It will be noted that the difference between method No. 2 and method No. 1 is that in method No. 2 the first factor, namely the quantity of fluid medium, is maintained constant. If this be done it is only necessary to measure the other two factors. In order to adapt the meter of Fig. 1 for method No. 2 it is therefore only necessary to substitute the part shown in Fig. 2 for the meter shown at 7 in Fig. 1. Fig. 2 shows a conduit 17 in which there is positioned an orifice plate 18. The fluid medium discharged from the coil 3 is caused to pass through this orifice plate, the orifice of which together with a constant pressure on the fluid medium will cause the fluid medium to pass through the coil 3 at a constant rate. The quantity of fluid medium used in a given time will therefore be maintained constant. Obviously any other means may be used to maintain the supply of fluid medium constant. The meter with this change therefore comprises means for maintaining the quantity of fluid medium constant; namely the orifice plate 18; it comprises means for measuring the temperature change of the fluid medium, namely the instrument 8 and its associated parts, and it comprises means for measuring the temperature change of the fluid, namely the instrument 13. The meter with the orifice plate of Fig. 2 substituted for the meter 7 of Fig. 1 may therefore be used to determine the necessary factors in accordance with method No. 2.

Fig. 5 discloses a meter in which method No. 3 may be carried out. This method differs from method No. 1 in that the temperature change of the fluid medium is maintained constant. In this figure the temperature change of the fluid is measured in the same manner that it is measured in Fig. 1 and the quantity of fluid medium is measured in the same manner that it is measured in Fig. 1. The meter shown in Fig. 5, however, involves the use of means for maintaining a constant temperature change of the fluid medium between the entrance and exit points of the coil 3. The means herein disclosed for accomplishing this purpose is adapted to act automatically to maintain a constant temperature change in the fluid medium. The mechanism by which this constant temperature change is maintained will not be described in detail as a somewhat similar mechanism is disclosed in the patent to C. C. Thomas, No. 1,222,492 of April 10th, 1917. It will be sufficient for the present purpose to note that this mechanism comprises a by-pass valve 19 connected between the entrance and exit points of the coil 3. This valve is actuated by a shaft 20 which is automatically controlled in the manner hereinafter described. It is obvious that by by-passing more or less of the fluid medium through the valve 19 the difference in temperature of the fluid medium between the points 11 and 12 may be maintained practically constant.

At the entrance to the coil 3 in advance of the by-pass valve 19 there is positioned a thermometer resistance 21 and a similar resistance 22 is positioned in the fluid medium conduit at the exit of the coil 3. The material of which these two resistances are made is such that its resistance varies directly with its temperature. The thermometer resistances 21 and 22 constitute two arms of a Wheatstone bridge the other two arms of which are formed by the fixed resistances 23 and 24. An auxiliary resistance 25 termed in practice a temperature difference coil is adapted to be connected in series with the thermometer resistance 22 by means of a switch 26. When the switch 26 is in the full line position shown in the drawing the temperature difference coil 25 is in series with the thermometer resistance 22, but when the switch is in the dotted line position the temperature difference coil 25 is cut out of circuit.

A galvanometer whose coil is shown at 27 is connected across the Wheatstone bridge and the needle of the galvanometer is shown at 28. The needle 28 of the galvanometer constitutes a part of a switch mechanism to be hereinafter described.

Before the meter is placed in operation the switch 26 is opened to exclude the temperature difference coil 25 from circuit, and then the Wheatstone bridge is balanced by adjusting a resistance 29. When the Wheatstone bridge is in a state of balance the needle of the galvanometer will of course be in its central position. The switch 26 is then closed to insert the temperature difference coil 25 in series with the thermometer resistance 22. This immediately destroys the balance of the Wheatstone bridge, but the balance will be restored when the proper quantity of liquid is by-passed through the valve 19 so that the combined resistance of the resistances 22 and 25 is equal to the resistance of the thermometer resistance 21. It is now being assumed that the coil 3 is imparting heat to the fluid. The temperature of the fluid medium before it enters the coil 3 is therefore higher than its temperature when it leaves the coil 3. The valve 19 must be actuated to by-pass the proper amount of fluid medium so that the two resistances 22 and 25 will be cooled the proper amount to cause their combined resistance to equal the resistance of the thermometer resistance 21. The Wheatstone bridge will then balance. Therefore, whenever the Wheatstone bridge is in a state of balance the temperature of the fluid medium at 12 is a certain definite amount lower than the temperature of the fluid medium at 11. This amount is of course determined by the resistance of the auxiliary resistance or temperature difference coil 25.

The needle of the galvanometer is used to control electrical circuits in such a way that when the needle is deflected in one direction or the other the valve 19 is automatically actuated so as to maintain the temperature change of the fluid medium constant and restore the balance of the Wheatstone bridge in the manner just described.

The needle 28 of the galvanometer moves over a contact support 30 carrying two contacts 31 and 32. The support 30 is periodically reciprocated in a vertical direction by an electromagnet 33 which is controlled by contact segments 36 and 36' on a rotating drum 34. When the support 30 moves upwardly the galvanometer needle 28 is clamped under a corresponding one of a series of contacts 35 if the galvanometer needle has been deflected in one direction or the other. When the drum 34 rotates an electric circuit will then be completed through the contact segment 36 and one of three other contact segments 36'' on the drum to one or the other of two electromagnets 37. The particular segment 36'' through which the circuit is completed depends upon which one of the contacts 35 the galvanometer needle is clamped under and the particular magnet 37 that is energized depends upon whether the galvanometer needle is clamped over the contact 31 or contact 32. The electromagnets 37 are carried by rocker arms 38 which are oscillated continuously by connecting rods 39 eccentrically connected to the shaft 40. The shaft 40 and the drum 34 are rotated by an electric motor 41 through suitable reduction gearing. The motor 41 also drives a generator 42 for furnishing the necessary current for the electric circuits. When one of the magnets 37 is energized it attracts the corresponding pawl 43. This pawl then becomes effective to transmit rotation to a ratchet wheel 44. The direction of rotation of ratchet wheel 44 will depend upon which magnet 37 is energized. The ratchet wheel 44 is connected to a shaft 45 which rotates the valve shaft 20 through suitable reduction gearing 46.

The contact segments 36'' on the drum 34 are of different lengths to vary the length of the period during which the magnets 37 are energized. If the needle 28 of the galvanometer is deflected in either direction only a slight amount, a circuit will be completed through the shortest segment 36'' on the drum 34 because the finger of the shortest segment 36'' is connected to the innermost contacts 35. One of the magnets 37 will then be energized only long enough to move the ratchet wheel 44 a distance of about one tooth. If the galvanometer needle be deflected in either direction a greater amount, a circuit will be completed through the next longer segment 36'' on the contact drum 34 because the finger of this segment is connected to the next two contacts 35. One of the magnets 37 will then be energized long enough to move the ratchet wheel 44 a distance of about two teeth. If the galvanometer needle is deflected enough to be clamped under either of the two extreme contacts 35 the circuit is completed through the longest segment 36'' on the contact drum. Then the ratchet wheel 44 will be moved a distance of about three teeth. The direction in which the ratchet wheel 44 is moved will depend upon which magnet is energized, and this in turn will depend upon the direction of deflection of the galvanometer needle 28, that is, whether the galvanometer needle is clamped over the contact 31 or the contact 32 of the support.

It will now be seen that if the fluid medium flowing through the coil 3 is cooled too much by the fluid the balance of the Wheatstone bridge will be destroyed and the valve 19 will be automatically actuated to by-pass some of the fluid medium and thereby restore the balance of the Wheatstone bridge. If the fluid medium in the coil 3 is not cooled enough by the fluid the valve 19 will be automatically actuated in the opposite direction to maintain the balance of the Wheatstone bridge. The mechanism described therefore operates to maintain a constant temperature change between the points where the thermometer resistances 21 and 22 are located.

If the coil 3 were used to absorb heat from the fluid, that is, to cool the fluid, the auxiliary resistance or temperature difference coil 25 should be connected in series with the thermometer resistance 21 instead of the thermometer resistance 22 as shown in Fig. 5ª. The valve 19 would then be actuated to by-pass the proper quantity of fluid medium to heat the thermometer resistance 22 until its resistance equaled the combined resistance of the thermometer resistance 21 and the temperature difference coil 25.

The meter shown in Fig. 5 is therefore adapted to carry out method No. 3 because it has means for maintaining the temperature change of the fluid medium constant, namely the automatic mechanism just described, it has means for measuring the quantity of fluid medium, namely the meter 7, and it has means for measuring the temperature change of the fluid, namely the instrument 13 and its associated parts.

Fig. 6 shows a meter which is adapted to carry out method No. 4. This method differs from method No. 1 in that the temperature change of the fluid is maintained constant. The other factors are measured as in method No. 1.

The meter shown in Fig. 6 therefore has a meter 7 for measuring the quantity of fluid medium, and an instrument 8 for measuring the temperature change of the fluid medium in the same manner that the temperature change of the fluid medium is measured in Fig. 1.

The mechanism for maintaining the temperature change of the fluid constant is practically the same as the mechanism shown in Fig. 5 for maintaining the temperature change of the fluid medium constant. The only difference is that the thermometer resistances 21 and 22 are replaced by resistance in the fluid conduit as shown at 47 and 48 and the temperature difference coil 25 is also replaced by one in the fluid conduit as shown at 49. The thermometer resistance 47 is placed at the entrance side of the coil 3 and the thermometer resistance 48 is placed at the exit side of the coil 3. Instead of the shaft 20 of Fig. 5 operating a by-pass valve, such as the valve 19, it operates a valve 50 for controlling the total flow of fluid medium through the system. The mechanism shown in Fig. 6 operates in the same manner as that shown in Fig. 5. The circuits are arranged for a meter in which heat is imparted from the coil 3 to the fluid because the temperature difference coil 49 is connected in series with the entrance thermometer 47. The valve 50 will therefore be automatically controlled so that the coil 3 will impart enough heat to the fluid at all times to cause the ohmic resistance of the thermometer resistance 48 to equal the combined ohmic resistance of the thermometer resistance 47 and the temperature difference coil 49 to thereby maintain the Wheatstone bridge in a state of balance. The meter shown in Fig. 6 will therefore operate to maintain constant the temperature rise in the fluid between the places where the thermometer resistances 47 and 48 are located. This temperature rise will be determined by temperature difference coil 49.

If the meter is to be used to measure the rate of flow by cooling the fluid the temperature difference coil 49 should be connected in series with the exit thermometer resistance 48 as shown in Fig. 6ª so that the mechanism will automatically maintain a constant temperature drop in the fluid which temperature drop will be determined by the temperature difference coil 49.

It will therefore be seen that the meter shown in Fig. 6 is adapted to carry out method No. 4 because it has means for maintaining the temperature change of the fluid constant, namely the automatic mechanism referred to; it has means for measuring the quantity of fluid medium, namely the meter 7, and it has means for measuring the temperature change of the fluid medium, namely the instrument 8 and its associated parts.

The meter disclosed in Fig. 7 is adapted to carry out method No. 5. This is the first method listed above in which two of the factors are maintained constant. The quantity of fluid medium is maintained constant and the temperature change of the fluid medium is maintained constant but the temperature change of the fluid is measured.

The quantity of fluid medium is maintained constant by causing it to pass at constant pressure through an orifice plate 51 located in the housing 52. The fluid medium passes through this orifice plate before it reaches the coil 3 and therefore the fluid medium is supplied at a constant rate. After the fluid medium passes through the orifice plate and before it reaches the coil 3 it is discharged into a tank 53 so that there will always be a supply of fluid medium in reserve to pass through the coil 3.

The temperature change of the fluid medium is maintained constant by the same mechanism as disclosed in Fig. 5. The shaft 45 shown in Fig. 7 is actuated in the same manner that it is actuated in Fig. 5 and the conductors from the resistances 21, 22 and 25 are connected with the mechanism shown in Fig. 5 in the same manner as disclosed in Fig. 5. The line A—B in Figs. 5 and 7 represents the place at which the conductors shown in Fig. 7 connect with the other portion of the corresponding conductors shown in Fig. 5.

The temperature change of the fluid is measured by the instrument 13 and the thermometer bulbs 14.

It will therefore be seen that Fig. 7 is adapted to carry out method No. 5 because it has means for maintaining the quantity of fluid medium constant, namely the orifice plate 51 and its associated parts; it has means for maintaining the temperature change of the fluid medium constant, namely the automatic mechanism for actuating the by-pass valve 19, and it has means for measuring the temperature change of the fluid, namely the instrument 13 and its associated parts.

The meter shown in Fig. 8 is adapted to carry out method No. 6. In this method the temperature change of the fluid medium is maintained constant and the temperature change of the fluid is maintained constant but the quantity of fluid medium is measured.

The quantity of fluid medium is measured by a meter 7. The temperature change of the fluid medium is maintained constant by the use of mechanism such as shown in Fig. 5. The by-pass valve 19 would then be automatically actuated by the shaft 45 in the same manner that it is so actuated in Fig. 5. The conductors in Fig. 8 from the resistances 21, 22 and 25 are connected to the other parts of the corresponding conductors in Fig. 5 at the line A—B.

The temperature change of the fluid is maintained constant by the same mechanism that is used in Fig. 6. The valve 50 will then be automatically actuated in the same manner that it is actuated in Fig. 6 to control the total quantity of fluid medium passing through the coil 3 so that a constant temperature change will be maintained in the fluid between the places where the thermometer resistances 47 and 48 are located. The conductors from the resistances 47, 48 and 49 are connected to the other parts of the corresponding conductors in Fig. 6 at the line C—D.

The meter shown in Fig. 8 is therefore adapted to carry out method No. 6 because it has means for maintaining a constant temperature change of the fluid medium, namely the mechanism for automatically actuating the by-pass valve 19; it has means for maintaining the temperature change of the fluid constant, namely the mechanism for automatically actuating the valve 50, and it has means for measuring the quantity of fluid medium, namely the meter 7.

Figure 9:
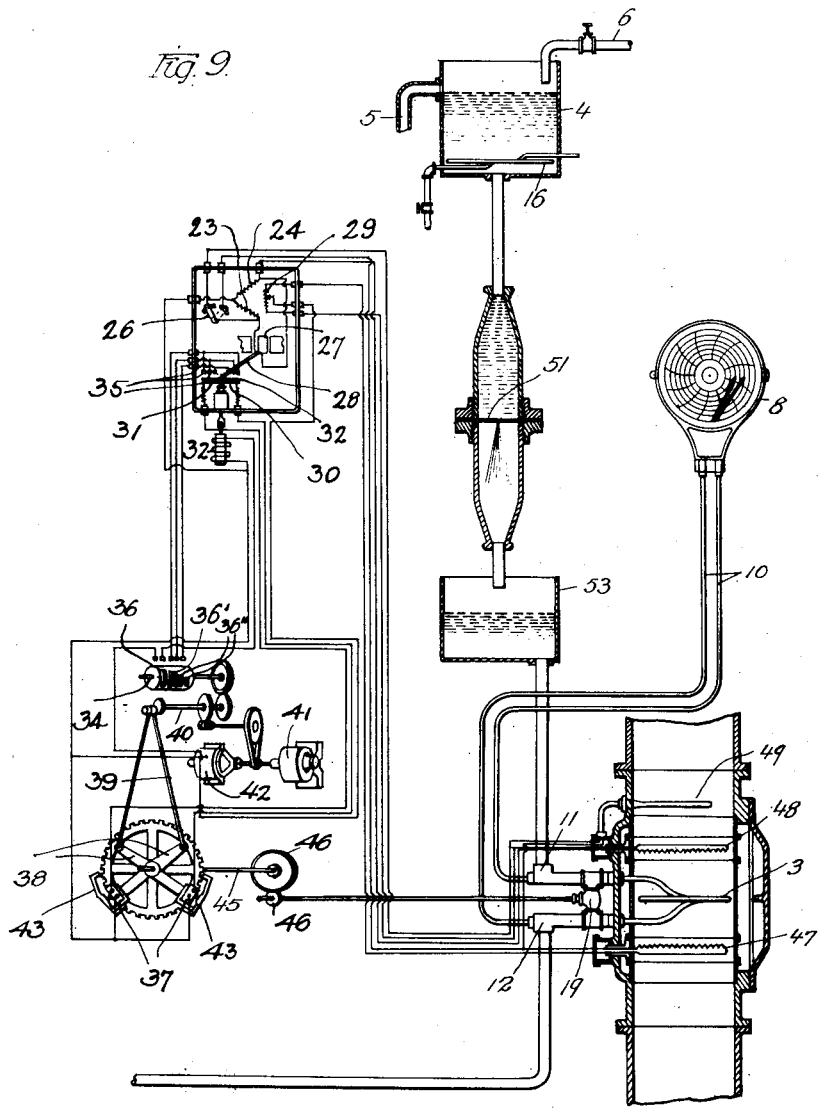

The meter shown in Fig. 9 is adapted to carry out the last method listed above. In this method the quantity of fluid medium is maintained constant, the temperature change of the fluid is maintained constant and the temperature change of the fluid medium is measured.

The quantity of fluid medium is maintained constant by the same mechanism that is shown in Fig. 7 for accomplishing this purpose, namely the orifice plate 51 and the reserve tank 53.

The temperature change of the fluid is maintained constant by the use of automatic mechanism such as shown in Fig. 6 except that the shaft 45 automatically actuates a by-pass valve 19 instead of actuating a valve for controlling the total flow of fluid medium is in Fig. 6. The mechanism shown in Fig. 9 for operating the valve 19 will therefore control this valve to vary the quantity of fluid medium passing through the coil 3 to maintain a constant temperature change in the fluid between the places where the thermometer resistances 47 and 48 are located. The valve 19 being a by-pass valve does not affect the total quantity of fluid medium passing through the system. This quantity is determined by the orifice plate 51 under constant pressure and is maintained constant.

The temperature change of the fluid medium is measured by an instrument 8 in the same manner as in all of the other figures in which the temperature change of the fluid medium is measured.

The meter shown in Fig. 9 is therefore adapted to carry out method No. 7 because it has means for maintaining the quantity of fluid medium constant, namely the orifice plate 51 and its associated parts; it has means for maintaining the temperature change of the fluid constant, namely the mechanism for automatically actuating the by-pass valve 19, and it has means for measuring the temperature change of the fluid medium, namely the instrument 8 and its associated parts.

It will now be seen that all of the different forms of meters herein disclosed have means for causing a heat transfer between a fluid medium, namely the fluid medium circulating through the coil 3, and the fluid to be measured. This heat transfer may be in either direction, that is, heat may be imparted to the fluid to be measured or heat may be absorbed from the fluid to be measured. All of the different forms of meters disclose means for utilizing the temperature change of the fluid medium in determining the rate of flow. This may be means for measuring the temperature change or means for maintaining the temperature change constant. All of the different forms of meters also have means for utilizing the temperature change of the fluid in determining the rate of flow. This means may serve to measure the temperature change or to maintain it constant. All of the different forms of meters also have means for utilizing the quantity of the fluid medium in determining the rate of flow and such means may serve to measure the quantity or to maintain it constant.

Therefore, all of the forms of the meter herein disclosed involve means for utilizing in determining the rate of flow of the fluid the following factors, the temperature change of the fluid medium, the quantity of the fluid medium, and the temperature change of the fluid.

When all three of the factors are measured the rate of flow may be determined by using these factors in the equation given above. When one of the factors is maintained constant it is of course only necessary to measure the other two. When two of the factors are maintained constant it is only necessary to measure the third.

Where two of the variables are maintained constant it is possible of course to calibrate the meter so that the instrument for measuring the third variable will indicate directly the rate of flow of the fluid. The use of the equation in determining the rate of flow may then be dispensed with. In fact it is possible to dispense with the use of equation altogether as the readings may be taken from the instruments and then suitable calibration curves may be referred to to obtain the rate of flow.

It will now be seen that the meters herein disclosed may be used in determining the rate of flow of a fluid regardless of variations in the temperature of the fluid when it reaches the meter. In the operation of the meters heat may be imparted to the fluid by the fluid medium or heat may be absorbed from the fluid by the fluid medium. In the former case the fluid is heated and in the latter case the fluid is cooled. When the fluid is heated, one advantage over other proposed meters in which the fluid is heated by a fluid medium, resides in the fact that it is only the heat which is actually transmitted to the fluid by the fluid medium that is utilized in determining the rate of flow. In other words it is only the quantity of heat given up by the fluid medium from the time it enters the coil 3 until the time it leaves the coil that is utilized. The amount of heat imparted to the fluid medium by the coil 16 is immaterial and hence this heat does not have to be carefully preserved. When the fluid is cooled, one advantage over other proposed meters in which the fluid is cooled resides in the fact that the meter will accurately measure the rate of flow regardless of the temperature of the incoming fluid and this is not true in other proposed meters in which the fluid is cooled. Also it is to be understood that the aforedescribed apparatus is inherently adapted to obviate errors due to variations in pressure of the entering fluid to be metered, such feature being moreover necessarily contemplated in the aforestated equation in accordance with which the apparatus is adapted to function.

It will be understood that the apparatus illustrated for carrying out the different methods is merely illustrative. These exemplary types of apparatus have been specifically described merely to give a clear understanding of the invention but the specific description should not be construed in a limiting sense.

Furthermore, a distinct type of meter has been disclosed for carrying out each of the above mentioned methods. This has been done for the purpose of making the description clear. In practice it may be possible to construct one meter which may carry out a large number or possibly all of the methods herein mentioned. Moreover, the meters herein disclosed may be capable of being used in determining the rate of flow by other methods than those which have been described.

What I claim is:

1. In a method of ascertaining the rate of flow of a fluid, the steps which comprise causing a heat transfer between the flowing fluid and a fluid medium, and determining the temperature change of said fluid, the temperature change of the fluid medium and the quantity of the latter.

2. In a method of ascertaining the rate of flow of a fluid, the steps which comprise causing a heat transfer between the flowing fluid and a liquid, and determining the temperature change of the fluid, the temperature change of the liquid and the quantity of the latter.

3. In a method of ascertaining the rate of flow of a fluid, the steps which comprise absorbing heat from the flowing fluid, and measuring the amount of heat absorbed and the temperature effect on said fluid of the heat transfer.

4. In a method of ascertaining the rate of flow of a fluid, the steps which comprise absorbing heat from the flowing fluid by a fluid medium, and determining the quantity of the fluid medium, the temperature effect on said fluid and the temperature effect on said fluid medium.

5. In a method of ascertaining the rate of flow of a fluid, the steps which comprise absorbing heat from the flowing fluid by a fluid medium, and measuring the drop in temperature of said fluid, the rise in temperature of said fluid medium and the quantity of the latter.

6. In a method of ascertaining the rate of flow of a fluid, the steps which comprise causing a heat transfer between the flowing fluid and a fluid medium so that there are three factors involved, the temperature change of said fluid, the temperature change of the fluid medium and the quantity of fluid medium, and maintaining at least one of said factors of a constant known value and measuring the other factors or factor.

7. In a method of ascertaining the rate of flow of a fluid, the steps which comprise causing a heat transfer between the flowing fluid and a fluid medium so that there are three factors involved, the temperature change of the fluid, the temperature change of the fluid medium and the quantity of fluid medium, and maintaining two of said factors of constant known values and measuring the third.

8. In a method of ascertaining the rate of flow of a fluid, the steps which comprise absorbing heat from the flowing fluid by a fluid medium so that there are three factors involved, the temperature drop of the fluid, the temperature rise of the fluid medium and the quantity of fluid medium, and maintaining at least one of said factors of a constant known value and measuring the other factors or factor.

9. In a method of ascertaining the rate of flow of a fluid, the steps which comprise absorbing heat from the flowing fluid by a fluid medium so that there are three factors involved, the temperature drop of the fluid, the temperature rise of the fluid medium and the quantity of fluid medium, and maintaining two of said factors of constant known values and measuring the third.

10. Apparatus for ascertaining the rate of flow of a fluid, comprising means for circulating said fluid in heat exchanging relation with a fluid medium, and means for determining the temperature change of said fluid, the temperature change of the fluid medium and the quantity of fluid medium.

11. Apparatus for ascertaining the rate of flow of a fluid, comprising means for circulating said fluid in heat exchanging relation with a liquid, and means for determining the temperature effect of the heat transfer on said fluid, the temperature effect of the heat transfer on said liquid and the quantity of liquid.

12. Apparatus for ascertaining the rate of flow of a fluid, comprising means for circulating said fluid in heat exchanging relation with a fluid medium so that heat may be absorbed from said fluid by the fluid medium, and means for enabling the rate of flow of said fluid to be determined from the effect of the heat transfer, said means comprising means for measuring the temperature drop of said fluid, the temperature rise of said fluid medium, and the rate of flow of the latter.

13. Apparatus for ascertaining the rate of flow of a fluid, comprising means for circulating said fluid in heat exchanging relation with a fluid medium, and means for determining the temperature change of said fluid, the temperature change of the fluid medium and the quantity of the latter, said means including mechanism for maintaining at least one of said factors of a constant known value.

14. Apparatus for ascertaining the rate of flow of a fluid, comprising means for circulating said fluid in heat exchanging relation with a fluid medium, and means for determining the temperature change of said fluid, the temperature change of the fluid medium and the quantity of the latter, said means including mechanism for automatically maintaining at least one of said factors of a constant known value.

15. Apparatus for measuring the rate of flow of fluids comprising means for circulating a fluid medium in heat exchanging relation with the fluid to be measured, and means whereby the quantity of fluid medium, the temperature change thereof and the temperature change of the fluid may be measured to determine the rate of flow, said means including mechanism for maintaining two of said factors of constant known values.

16. Apparatus for measuring the rate of flow of fluids comprising means for circulating a fluid medium in heat exchanging relation with the fluid to be measured, and means whereby the quantity of fluid medium, the temperature change thereof and the temperature change of the fluid may be measured to determine the rate of flow, said means including mechanism for automatically maintaining two of said factors of constant known values.

In witness whereof, I have hereunto subscribed my name.

JOHN C. WILSON.